United States

Drisko

4,039,494

Aug. 2, 1977

[54] FUNGUS RESISTANT PROTECTIVE COATINGS

[75] Inventor: Richard W. Drisko, Oxnard, Calif.

[73] Assignee: The United States of America as represented by the Secretary of the Navy, Washington, D.C.

[21] Appl. No.: 661,472

[22] Filed: Feb. 26, 1976

[51] Int. Cl.² .......................... C09D 3/64; C09D 5/14
[52] U.S. Cl. ............................... 260/22 A; 106/15 R; 424/248.55
[58] Field of Search ............... 260/22 A; 106/15 AF, 106/15 R

[56] References Cited

U.S. PATENT DOCUMENTS

| | | | |
|---|---|---|---|
| 3,337,352 | 8/1967 | Sano et al. | 106/15 AF |
| 3,426,473 | 2/1969 | Cardarelli et al. | 106/15 AF |
| 3,639,583 | 2/1972 | Cardarelli et al. | 106/15 AF |
| 3,684,752 | 8/1972 | Goto et al. | 106/15 AF |
| 3,832,190 | 8/1974 | Fujimura et al. | 106/15 AF |
| 3,839,052 | 10/1974 | Peterson | 106/15 AF |
| 3,854,960 | 12/1974 | Plum et al. | 106/15 AF |

*Primary Examiner*—Ronald W. Griffin
*Attorney, Agent, or Firm*—Richard S. Sciascia; J. M. St. Amand

[57] ABSTRACT

The reaction products of fatty acids and bis(tributyl tin) oxide are combined with an unreacted alkyd resin, or an alkyd resin, which has been reacted with an organotin compound, in concentrations to form homogeneous blends that will air cure and are capable of being pigmented to form durable paint films having relatively large tin contents and great resistance to microbial growth.

13 Claims, No Drawings

FUNGUS RESISTANT PROTECTIVE COATINGS

BACKGROUND OF THE INVENTION

The present invention relates to paints and protective coatings, and particularly to a paint coating to prevent fungal or microbial growths.

In the past, toxic materials for control of microbial growth generally have been added to alkyd coatings as "external biocides" rather than chemically combining them with alkyd polymers to make them "internal biocides". The current practice of merely adding biocides to alkyd resins for control of fungal growth permits rapid loss to the environment resulting in loss of protection and contamination of the environment. By combining the biocide chemically to the resin, smaller amounts of biocide are required and its release controlled, thus achieving longer protection without as much adverse effects.

In the old procedures with added biocides for use in alkyd paints in tropical or other geopgraphical areas where fungal or other microbial growths were a problem, the toxic "external biocides" were hazardous to handle, were frequently lost rapidly by leaching with rainwater or by volatilization, thus limiting their period of protection, or contaminated the environment in quantities which might produce adverse ecological effects. The new "internal biocides" are required in lesser quantities and are released at a much lower, controlled rate, thus retarding microbial growths for longer periods of time and constituting a lesser health or enviornmental hazard.

Prior coatings, particularly those for antifouling purposes, require high tin content (more than 5% by weight) and an alkyd resin value larger than 20, and also require that free (unreacted) carboxyl groups by present by using less than an equivalent amount of organotin compound. The present invention, however, is for a resin for paints used on atmospheric exterior surfaces where fungal or other microbial growth is a problem. This invention requires a much smaller tin content (e.g., 2% by weight), and is normally achieved using alkyd resins with an acid value less than 20 and by reacting it with an equivalent amount of the organotin compound so that no free carboxyl groups are present.

A primary purpose of the invention is to incorporate by chemical reaction a biocidal material into an alkyd proctective coating polymer as an actual chemically-bound component of the polymer rather than merely as an additive for use in a finished paint coating to prevent fungal or other microbial growth on buildings and other structures.

A further embodiment of this invention reacts organotin compound with a free vegetable oil acid and combines the reaction product with an alkyd resin (either reacted or unreacted with tin) to form a variety of compositions that will cure in air as hard biocidal paint films.

SUMMARY OF THE INVENTION

The present invention is for air cured, protective paint coatings using alkyd resins with an acid value less that 20 reacted in boiling benzene (approximately 80° C) with an equivalent amount of organotin compound so that the organotin is chemically incorporated into the resin and no free carboxyl groups are present. Also, by reacting tri-N-butyltin oxide with a free vegetable oil acid and combining the resulting product with an alkyd resin, either reacted or unreacted with an organotin compound, a homogeneous blend containing no free carboxyl groups is produced that is capable of being pigmented and that will air cure to form solid protective biocidal films. In using these protective coatings, the toxicant is released by chemical reaction (hydrolysis) rather than from simple leaching of an added ingredient.

DETAILED DESCRIPTION OF THE PREFERRED EMBOIDMENT

Isophthalic alkyd resins can be combined according to this invention to convert them to tin-containing resins (vehicles) that are readily formulated into three classes of fungal-resistant paints for use on new or previously painted wood, siding, primed metal or sealed concrete, as indicated below.

Available organotin biocidal materials can be chemically reacted with alkyd resins so that the organotin materials become part of the resin. Thus, tri-N-butyltin oxide dissolved in hot organic solvent, such as boiling benzene (approximately 80° C), readily reacts with an alkyd polymer containing free carboxyl groups such as from a polybasic acid component. If the reaction is conducted in benzene solution, the course of the reaction can be followed by the azeotropic distillation of the water formed in the reaction. The tin-containing alkyd resins can then be used to formulate a variety of paint coating systems.

The acid value of the resin is calculated to determine the quantity of tin compound needed to be reacted therewith sufficient to react with all the carboxyl groups so there will be no excess tin compound remaining.

| PIGMENT COMPOSITION (PERCENT BY WEIGHT) | | | |
|---|---|---|---|
| | Class A | Class B | Class C |
| | Self-Cleaning White | Chalk-Resistant White | Tints |
| Titanium dioxide, rutile type (TiO$_2$ 93% min.)(ASTM D-476, Type IV) | 26 min. | 50 min. | 32–34 |
| Titanium dioxide, anatase (ASTM D-476, Type I) | 25 max. | — | — |
| Total of rutile and anatase TiO$_2$ | 50 min. | — | — |
| Zinc oxide, American process (TT-P-463, Gr. A) | 19–21 | 19–21 | 19–21 |
| Magnesium silicate (TT-P-403) | 31 max. | 31 max. | — |
| Calcium carbonate (ASTM D-1199, Ty. GC, Gr. II) | — | — | 48 max. |

VEHICLE COMPOSITION

Tin-containing phthalic alkyd resin (such as those made by reaction of fish oils or vegetable oils, such as safflower, soya, sunflower, linseed or tall oil with phthalic anhydride) with necessary driers comprise about 80% of the vehicle. The remainder of the vehicle is composed of solvents such as mineral spirits distilling between 150° C and 250° C.

The final paint formulation consists of approximately 50% pigment by weight and 50% vehicle by weight, adjusted to give satisfactory brushing or spraying properties.

Because of their instability, alkyd resins with large numbers of carboxyl groups (high acid values) are generally unavailable for reaction with bis(tributyl tin)

oxide for synthesis of alkyd resins containing organotin biocidal components. Free fatty acids (for example, acids produced from the hydrolysis of linseed, tung, or soybean oils) have high acid values and react readily with bis(tributyl tin) oxide by the same type of chemical reaction and under the same conditions as do alkyd resins with free carboxyl groups. The reaction products of the fatty acids and bis(tributyl tin) oxide have very high tin contents but do not air cure to form solid films; however, they can be combined with an alkyd resin (either reacted or unreacted with an organotin compound) in concentrations as great as 50% or more to form homogeneous blends that will air cure to form solid films. These blends can be pigmented to form paints. A variety of such materials which cure to form durable paint films having relatively large tin contents and, thus, great resistance to microbial growth can be formulated.

EXAMPLES OF FUNGUS RESISTANT PAINT FORMULATIONS USING REACTION PRODUCT OF TRIBUTYLTIN OXIDE AND FATTY ACIDS

| Chemical Component | Percent by Weight Example 1 | Example 2 |
|---|---|---|
| Alkyd Resin[1] | 10 | 12 |
| TBTO-Fatty Acid Product[2] | 15 | 15 |
| Rutile Titanium Dioxide | 30 | 28 |
| Powdered Silica | 20 | — |
| Talc | — | 18 |
| Mineral Spirits[3] | 25 | 27 |
| Driers | Trace[4] | Trace[4] |

[1]. An alkyd resin such as those made by reaction of vegetableor fish oils with phthalic anhydride.
[2]The product formed by the reaction of tributyltin oxide with the carboxyl groups of fatty acids such as those derived from linseed, tung or soybean oils by hydrolysis.
[3]Mineral spirits of the types distilling between 150° C and 250° C.
[4]0.5% lead, 0.1% calcium, 0.07% cobalt, and 0.01% manganese driers, determined as weight of metal to whole paint.

Obviously many modifications and variations of the present invention are possible in light of the above teachings. It is therefore to be understood that within the scope of the appended claims the invention may be practiced otherwise than as specifically described.

What is claimed is:

1. A non-volatile composition for an air curable protective paint to control fungal and microbial growth on structures comprising:
    a. 30 to 70% by weight of a high tin content first reaction product, formed by the reaction of tributyltin oxide with the carboxyl groups of free fatty acids, that will not air cure to form a hard film;
    b. said first reaction product being combined with 70 to 30% by weight of a phthalic alkyd polymer having a resin acid value less than 20 to form a homogeneous blend which cures in air to form a hard film;
    c. the quantity of tributyltin oxide in the first reaction product being sufficient to react with all the carboxyl groups of said free fatty acids so that no free carboxyl groups remain present in said first reaction product;
    d. said composition providing an alkyd protective coating polymer having an internal biocidal material incorporated into the polymer as a chemically-bound component, said biocidal material being released at a controlled rate by hydrolysis thus retarding fungal and microbial growths on structures to which the coating is applied.

2. A non-volatile composition as set forth in claim 1 wherein said phthalic alkyd polymer is reacted with tributyltin oxide to form a second reaction product which contains up to 2% by weight of tin compound prior to being combined with said first reaction product.

3. A tin containing alkyd resin for formulating air curable protective paint to control fungal and microbial growth on structures, comprising the composition formed by:
    reacting a phthalic alkyd polymer having a resin acid value less than 20 with an equivalent amount of tri-N-butyltin oxide in boiling benezene (approximately 80° C) so that no free carboxyl groups are present; said resin acid value being calculated such that the quantity of tri-N-butyltin oxide used reacts with all the free carboxyl groups and there is no excess tin compound remaining;

4. An air curable protective paint for controlling fungal and microbial growth on structures comprising:
    a. a non-volatile vehicle composition containing no free carboxyl groups and comprised of: 70 to 30% by weight of a first reaction product, that will not air cure to form a solid film, formed by reacting tributyltin oxide with the carboxyl groups of free fatty acids; said first reaction product being combined with 30 to 70% by weight alkyd resin having an acid value of less than 20 to form a homogeneous blend which cures in air to form a solid film; the quantity of tributyltin oxide in the first reaction product being sufficient to react with all the carboxyl groups of said free fatty acids so that no free carboxyl groups remain present in the first reaction product;
    b. up to 65% by weight pigmentation and driers;
    c. up to 30% by weight mineral spirits;
    d. said composition providing an alkyd protective coating polymer having an internal biocidal material incorporated into the polymer as a chemically-bound component, said biocidal material being released at a controlled rate by hydrolysis thus retarding fungal and microbial growths on structures to which the paint is applied.

5. A protective paint as in claim 4 wherein said non-volatile vehicle contains up to approximately 2% by weight of tin.

6. A protective paint as set forth in claim 4 wherein said alkyd resin has been reacted with up to approximately 2% by weight of tributyltin oxide to form a second reaction product having no free carboxyl groups present prior to being combined with said first reaction product.

7. A protective paint as in claim 4 wherein said free fatty acids are produced from the hydrolysis of any of linseed, tung, and soybean oils.

8. A protective coating as in claim 4 wherein said free fatty acid is a free vegetable oil acid.

9. A protective paint as set forth in claim 4 wherein said alkyd resin is that formed by reaction of any of vegetable and fish oils with phthalic anhydride.

10. A protective paint in claim 4 wherein said alkyd resin is reacted with an organotin compound prior to being combined with said first reaction product.

11. A non-volatile, air curable protective coating for controlling fungal and microbial growth on structures exposed to the atmosphere comprising:
    a. 70 to 30% by weight of a first reaction product formed by reacting a free fatty acid with tributyltin oxide to form a product that will not cure in air to form a solid film;
    b. combining said first reaction product with from 30 to 70% by weight of phthalic alkyd polymer having a resin acid value less than 20 to form a homogeneous blend that contains no free carboxyl groups and is capable of being pigmented and will cure in air to form solid protective biocidal films;

c. the quantity of tributyltin oxide in the first reaction product being sufficient to react with all the carboxyl groups of said free fatty acid so that no free carboxyl groups remain present in said first reaction product.

12. A coating composition as set forth in claim 11 wherein said phthalic alkyd polymer is reacted with an organotin compound to form a second reaction product which contains up to 2% by weight of tin compound prior to being combined with said first reaction product.

13. An air curable protective paint for controlling fungal and microbial growth on structures exposed to the atmosphere comprising the mixture of:
  a. 10 to 12 percent by weight of an alkyd resin;
  b. 15 percent by weight of the reaction product of tributyltin oxide with the carboxyl groups of a fatty acid, the quantity of tributyltin oxide in said reaction product being sufficient to react with all the carboxyl groups of said fatty acid so that no free carboxyl groups remain present in said reaction product and said reaction product will not air cure to form a hard film;
  c. 28 to 30 percent by weight rutile titanium dioxide;
  d. up to 28 percent by weight powdered silica;
  e. up to 18 percent by weight talc;
  f. 25 to 27 percent by weight mineral spirits;
  g. 0.01 to 0.5 percent by weight of driers;
  h. said composition providing an alkyd protective coating polymer having an internal biocidal material incorporated into the polymer as a chemically-bound component, said biocidal material being released at a controlled rate by hydrolysis thus retarding fungal and microbial growths on structures to which the paint is applied.

* * * * *